United States Patent [19]

Cain et al.

[11] Patent Number: 4,917,915
[45] Date of Patent: Apr. 17, 1990

[54] WATER-IN-OIL EMULSION SPREAD

[75] Inventors: Frederick W. Cain, Rushden; Malcolm G. Jones, Stevington; Ian T. Nortan, Rushden, all of Great Britain

[73] Assignee: Lever Brothers Company, New York, N.Y.

[21] Appl. No.: 20,423

[22] Filed: Mar. 2, 1987

[30] Foreign Application Priority Data

Mar. 6, 1986 [GB] United Kingdom ............... 8605559
Aug. 18, 1986 [GB] United Kingdom ............... 8620066

[51] Int. Cl.$^4$ ............................................. A23D 3/00
[52] U.S. Cl. .................................. 426/573; 426/602; 426/603; 426/804
[58] Field of Search ............... 426/603, 573, 804, 602, 426/604

[56] References Cited

U.S. PATENT DOCUMENTS

| | | | |
|---|---|---|---|
| 2,878,126 | 3/1959 | Roberts | 426/586 |
| 3,314,798 | 4/1967 | Graves | 426/586 |
| 3,360,377 | 12/1967 | Spitzer et al. | 426/604 |
| 3,360,378 | 12/1967 | Spitzer et al. | 426/604 |
| 3,397,995 | 8/1968 | Elenbogen | 426/602 |
| 4,089,981 | 5/1978 | Richardson | 426/104 |
| 4,177,293 | 12/1979 | Forman et al. | 426/43 |
| 4,305,970 | 12/1981 | Moran et al. | 426/603 |
| 4,536,408 | 8/1985 | Morehouse et al. | 426/804 X |

FOREIGN PATENT DOCUMENTS

| | | |
|---|---|---|
| 1068978 | 1/1980 | Canada . |
| 1127000 | 7/1982 | Canada ............... 426/603 |
| 0011891 | 6/1980 | European Pat. Off. . |
| 0011344 | 5/1982 | European Pat. Off. . |
| 0052899 | 6/1982 | European Pat. Off. . |
| 0098664 | 11/1984 | European Pat. Off. . |
| 1692526 | 8/1971 | Fed. Rep. of Germany . |
| 1094268 | 12/1967 | United Kingdom . |
| 2035360 | 6/1980 | United Kingdom . |
| 2084171 | 4/1982 | United Kingdom . |

*Primary Examiner*—Donald E. Czaja
*Assistant Examiner*—Celine T. Callahan
*Attorney, Agent, or Firm*—Gerard J. McGowan, Jr.

[57] ABSTRACT

Spreads containing less than 35 wt. % fat, comprising 10–35 wt. % continuous fat phase and 90–65 wt. % dispersed aqueous phase that are stable at ambient temperature and do not lose moisture when spread, but that destabilize and release their flavor in the mouth and that can be prepared relatively easily despite the very low fat content, can be obtained by using as composition that is to constitute the aqueous phase, a gel-forming composition having a viscosity of at least 20 mPa.s when measured at 5° C. and at a shear rate of 17090 sec.$^{-1}$.

18 Claims, No Drawings

WATER-IN-OIL EMULSION SPREAD

BACKGROUND OF THE INVENTION

The present application is concerned with a spread containing less than 35 wt.% fat, comprising from 10 to 35 wt.% continuous fat phase and from 90 to 65 wt.% dispersed aqueous phase.

Water-in-oil spreads that can be used as replacement for butter or margarine, having a fat content below 80 wt.%, are well known. A wide variety of such products is commercially available. Most of these products have a fat content of about 40 wt.%.

There is, however, a need for spreads comprising a continuous fat phase and a dispersed aqueous phase having a fat content of substantially less than 40 wt.%.

A spread should have a plastified continuous fat phase to give it suitable spreadability and to prevent microbiological deterioration. It should not release moisture when it is being spread. Furthermore, a spread should be spreadable at refrigerator temperature, be stable at room temperature, but destabilize and release its flavour in the mouth. These goals are very difficult to achieve if only a small amount of fat is to be used to constitute the continuous phase.

In GB 2,035,360 a process is disclosed for the preparation of water-in-oil spreads containing 20 wt.% fat. According to this process, the aqueous phase is sprayed onto the fatty phase. During the addition of the sprayed aqueous phase, the emulsion is circulated through a static mixer to increase the viscosity. The final viscosity suitably is about 18000 mPa.s at a shear rate of 13 sec.$^{-1}$ and 2700 mPa.s at a shear rate of 134 sec.$^{-1}$ at 38° C. When this viscosity has been obtained, the emulsion is cooled and worked to cause crystallization of fat to occur.

In practice, this process has not been successful. It is difficult to apply the process under factory conditions and the products obtained tend to be too stable in the mouth, which results in an insufficient release of flavour from the aqueous phase droplets.

EP 0 011 344 teaches to incorporate in fat-continuous spreads containing 18-82 wt.% fat phase, a gelled aqueous phase having a softening point of at least 33° C., showing a sharp decrease in gel strength at a temperature ranging from 45° to 70° C. and a gel strength at a temperature below the softening point ranging from 0.1 to 30 N/cm$^2$. The gelling agents to be used according to EP 0 011 344 are of the medium-melting type. The specification warns against using low-melting type gelling agents, e.g. gelatin, of which is said that they are often more difficult to process and may result in products of too sticky a mouthfeel or in too watery products. Spreads having very low fat contents, prepared with aqueous phase compositions as disclosed in EP 0 011 344 have been found to be unsatisfactory. In particular, such spreads tend to release water under spreading conditions.

U.S. Pat. No. 4,536,408 describes low-fat spreads comprising 15-35 wt.% fat and 15-35 wt.% of a non-gelling starch hydrolyzate having a DE (dextrose equivalent) of 4-25. The products are prepared by cooling and mixing the fat into an aqueous solution of the starch hydrolyzate with a high-speed blender, until phase inversion occurs. The products disclosed in U.S. Pat. No. 4,536,408 have been found to have a poor oral response. They do not break down sufficiently in the mouth and, consequently, they have a poor flavour release.

SUMMARY OF THE INVENTION

It has now been found that a water-in-oil spread with a very low fat content that is stable and spreadable at refrigerator and room temperature, that destabilizes and releases its flavour in the mouth and that does not release moisture when it is being spread can be obtained by employing as aqueous phase a gel-forming composition that has a sufficiently high viscosity at a shear rate of 17090 sec.$^{-1}$ and a temperature of 5° C.

Accordingly, the present invention provides a spread containing less than 35 wt.% fat, comprising from 10 to 35 wt.% continuous fat phase and from 90 to 65 wt.% dispersed aqueous phase, characterized in that the composition constituting the aqueous phase is a gel-forming composition that has a viscosity of at least 20 mPa.s at a shear rate of 17090 sec.$^{-1}$ and a temperature of 5° C.

It is an advantage of the present invention that the spreads can be prepared relatively easily. In particular, it has been found to be unnecessary to avoid using low-melting type gelling agents, e.g. gelatin. Also, when using gelling agents of this kind, the present spreads can be prepared conveniently using conventional equipment.

For example, the present spreads can suitably be prepared with conventional head exchangers such as Votator ®A-units and stirred C-units provided with a cooling jacket. Thus products can be prepared which, on the one hand, are sufficiently stable at ambient temperature and under spreading conditions and which are not overly sensitive to microbiological deterioration, despite the high water content, and which, on the other hand, readily destabilize in the mouth, thus allowing the flavours contained in the dispersed phase to be released.

DETAILED DESCRIPTION OF THE PREFERRED EMBODIMENTS

The spread is a dispersion having a plastified continuous fat phase and a dispersed aqueous phase. As is common practice with respect to products of this kind, the indication "continuous fat phase" is meant to include the oil present in the liquid state and forming a continuous phase as well as the solid fat particles contained in the liquid oil that have been phase-separated from the liquid oil by crystallization of fat by the plastification treatment. The "continuous fat phase" does not, however, include any fat contained in the dispersed aqueous phase, as occurs e.g. in a product having a so-called oil-in-water-in-oil structure.

The viscosity at 5° C. and a shear rate of 17090 sec.$^{-}$ of the composition constituting the aqueous phase is determined in a Ferranti Shirley test using a Ferranti Shirley Viscometer ® with a standard cone having a diameter of 7 cm. The instrument is calibrated in a conventional manner using standard silicon oils of known viscosity as commonly used for the calibration of viscometers. The test is carried out with a fresh composition by mixing together the aqueous phase ingredients, homogenizing the mixture, heating it to 60° C., which (for most compositions) ensures that any gel structure that may have formed disappears again by melting, putting a sample of 3 ml between cone and plate of the Ferranti Shirley Viscometer ®, cooling it down in 45 seconds from 60° C. to 5° C., and subjecting the sample to a shear rate of 17090 sec.$^{-1}$ maintaining, the sample at 5° C. while shearing of the sample is continued, and recording the viscosity after 5 minutes. (If the composition contains a gelling agent having a melting point above 60° C., then the mixture is heated to a correspondingly higher temperature to ensure that any gel structure that may have formed, melts.) Throughout this specification, by viscosity is meant the ratio of the measured shear stress and the applied shear rate. Since, generally, gel-forming compositions are non-Newtonian fluids, the viscosity depends on the applied shear rate. This dependency of the viscosity on the shear rate varies substantially with the aqueous phase composition. It is an essential aspect of the present invention that the viscosity at 5° C. of the aqueous phase composition lies above the threshold value of 20 mPa.s when it is subjected to a shear rate as high as 17090 sec.$^{-1}$. When this requirement is not met, then no satisfactory spread is obtained with such a composition constituting the aqueous phase.

No such correlation is found between the aqueous phase viscosity and the quality of the spread containing the aqueous phase, if the viscosity is measured at a low shear rate. For example, no correlation was found between the viscosity of aqueous phase compositions extrapolated to zero shear rate and the suitability of the compositions for use as aqueous phase in spreads with very low fat contents.

The viscosity of the composition constituting the aqueous phase of the present spread at a shear rate of 17090 sec.$^{-1}$ should be at least 20 mPa.s, when measured at 5° C. For most compositions suitable to constitute the aqueous phase of the present spreads, the viscosity at 17090 sec.$^{-1}$ is not strongly temperature dependent. For example, for most suitable compositions only a slightly different value is found if the viscosity of 17090 sec.$^{-1}$ is measured at 25° C. or 30° C. instead of at 5° C. However, for some suitable aqueous phase compositions, the viscosity at the indicated shear rate varies substantially with the temperature at which the measurement is carried out. Unless indicated otherwise, the viscosity at 17090 sec.$^{-1}$ is determined at 5° C., both for compositions exhibiting a strongly temperature dependent viscosity at 17090 sec.$^{-1}$ and for compositions for which the viscosity at 17090 sec.$^{-1}$ is not strongly temperature dependent.

It is an essential aspect of the present invention that the composition constituting the aqueous phase is a gel-forming composition, i.e. the composition must contain one or more gelling agents in a concentration at or above the critical concentration of that aqueous phase composition. If a composition that does not gel is employed as aqueous phase, then the products obtained are not satisfactory.

In the following, the viscosity at a shear rate of 17090 sec.$^{-1}$ and at a temperature of 5° C. is indicated as the M*-value. Unless indicated otherwise, the M*-value is determined with a Ferranti-Shirley Viscometer ® using the procedure described above.

The M*-value of the composition constituting the aqueous phase in the present spread preferably is at least 25 mPa.s; more preferably it is at least 30 mPa.s. It is particularly preferred that the M*-value is at least 35 mPa.s.

The composition constituting the aqueous phase suitably comprises at least 60 wt.% water (calculated on the weight of the aqueous phase composition); preferably it comprises at least 75 wt.% water. Preferred gelling agents of the aqueous phase composition are gelatin, carrageenan and gelling hydrolyzed starch derivatives (which, in general, have relatively low DE-values), in particular gelling maltodextrin, such as, for example, Paselli maltodextrin SA2 ®, and mixtures thereof. In addition to the gelling agent or agents, the aqueous phase composition may comprise bulking agents, and/or viscosity enhancers, e.g. guar gum and non-gelling hydrolyzed starch derivatives. (Hydrolyzed starch derivatives with relatively high DE-values generally do not gel; hydrolyzed starch derivatives with low DE-values, that do not gel, exist also.) Such thickeners preferably are present in the composition in an amount of 0-20 wt.% (calculated on the weight of the aqueous phase). When such thickeners are employed, preferably non-gelling maltodextrin is used. For example, 10-15 wt.% non-gelling maltodextrin, e.g. with a DE-value of 17, can advantageously be used in the aqueous phase composition.

The aqueous phase composition may suitably include gums, for example guar gum, which is a non-gelling thickener, locust bean gum (LBG) or xanthan gum. LBG and xanthan gum, as such, are non-gelling viscosity enhancers, but a synergistic effect occurs between LBG and xanthan gum in the sense that mixtures of these two gums can form gels. Similarly, LBG interacts with carrageenan and mixtures of the two give stronger gels than carrageenan on its own. The aqueous phase composition may suitably include microcrystalline cellulose.

The amount of gelling agent required in the aqueous phase composition depends on the particular gelling agent used and the other ingredients contained in the aqueous phase composition. For any particular aqueous phase composition, the adequate amount of gelling agent can easily be determined by checking that the composition forms a gel and measuring the M*-value as described above. If the composition does not gel or if the M*-value is below 20 mPa.s, this can be remedied by using a higher concentration of gelling agent and/or a different gelling agent. The M*-value may be adapted by including a thickening agent. A combination of two or more of these measures can be employed also. Preferably, the composition constituting the aqueous phase has an M*-value not higher than 200 mPa.s, more preferably not higher than 100 mPa.s.

Usually, the amount of gelling agent that can suitably be used in the composition constituting the aqueous phase lies between about 0.2 and 30 wt.%, mostly between about 1 and about 25 wt.% (on aqueous phase composition). A preferred aqueous phase composition comprises from 10 to 20 wt.% gelling hydrolyzed starch derivative. If, instead of gelling hydrolyzed starch derivative, other gelling agents are used, then usually an amount of at most about 10 wt.% is suitable. Mostly an amount of about 1 to 7 wt.% is preferred; an amount of about 2 to 5 wt.% being particularly preferred. The optimal amount of gelling agent or agents in the aqueous phase composition, however, depends to some extent on the other ingredients contained in the composition.

Particularly suitable products can be obtained with aqueous phase compositions that comprise both a gelling hydrolyzed starch derivative, such as a gelling maltodextrin, and another gelling agent, e.g. gelatin. Amounts that can be suitable in such mixtures are for example about 3-20 wt.%, preferably 5-17 wt.% of the hydrolyzed starch derivative and about 0.5-5 wt.% of the other gelling agent. It is particularly preferred for the aqueous phase composition to contain 5-15 wt.% gelling hydrolyzed starch derivative and 0.5-4 wt.% gelling agent other than hydrolyzed starch derivative.

Although the above-indicated quantities are applicable for most aqueous phase compositions, there are exceptions. For example, when using as gelling agent a gelling milk protein, e.g. Ca-caseinate, which can have a relatively high critical concentration, then it can be desirable to use amounts higher than 10 wt.%.

The aqueous phase composition may comprise, apart from water, gelling agents and optionally thickeners, other ingredients that are commonly incorporated in spreads, e.g. flavouring agents, colouring matter, emulsifiers, salt, preservative, acid, etc.

Similarly, additives may be contained in the fat phase composition. For example, the fat phase composition may comprise a blend of triglycerides supplemented with emulsifiers and coluring matter.

The aqueous phase composition may include some fat, but preferably the fat content of the aqueous phase composition is not higher than about 10 wt.%. It is particularly preferred that the aqueous phase composition comprises essentially no fat.

The spread according to the present invention preferably comprises from about 15 to about 30 wt.% fat, more preferably from 17 to 25 wt.% fat.

Throughout this specification the terms oil and fat are used interchangeably. They are meant to include triglycerides such as soyabean oil, sunflower oil, palm oil, fish oil, rapeseed oil, coconut oil, chemically and/or physically modified products such as hydrogenated, fractionated and/or interesterified triglyceride mixtures and mixtures of two or more thereof, as well as edible substances that are physically similar to triglycerides such as waxes, e.g. jojoba oil, and poly fatty acid esters of mono- or disaccharides, and that can be used as replacement for or in admixture with triglycerides. Preferably, the fat contained in the present spreads consists essentially of triglycerides.

The precise composition of the fat is not critical. For organoleptic reasons, it is preferred to employ a fat that has a solid fat content at 35° C. of less than 5 wt.% (calculated on the weight of the fat), more preferably less than 3 wt.%. The solid fat content at 20° C. is suitably between 5 and 30 wt.%, preferably between 5 and 20 wt.%. At 5° C. the solid fat content is suitably between 5 and 50 wt.%, preferably between 10 and 25 wt.%.

The solid fat content can conveniently be determined by measuring the NMR N-value as described in Fette, Seifen, Anstrichmittel, 80 (1978), 180-186, which indicates the amount of fat present in the solid state expressed in percentage of the weight of the fat.

A triglyceride mixture that can suitably be used as fat in the present spread is, for example, a mixture of 83 wt.% liquid oil, e.g. sunflower oil, with 17 wt.% of a randomly interesterified mixture of equal amounts of fully hydrogenated coconut oil and palm oil.

The aqueous phase and/or the fat phase can suitably include emulsifiers. The amount and kind of emulsifier included are not critical. It is preferred to incorporate emulsifiers of the type and quantity as are commonly used in spreads. For example, mixtures of mono- and diglycerides derived from natural, partially hydrogenated or fully hardened sunflower oil can suitably be employed, using an amount of about 0.2 to about 0.5 wt.%, calculated on the total weight of aqueous phase and fat phase. Alternatively, other oil-compatible emulsifiers can be used. Mixtures of such emulsifiers with mono- and/or diglycerides can also be suitable as emulsifier.

Typically, the average droplet size of the dispersed aqueous phase is between about 30 and about 60 μm, but it may be larger or smaller than that.

The average droplet size, as referred to herein, is the volume weighted mean of the droplet size distribution. It can be determined with NMR following the procedure as described in J. Colloid and Interface Science (1972), 10, 206 and (1983), 93, 521.

With such a droplet size, on the one hand satisfactory flavour release in the mouth can be obtained, while on the other hand the produce can have an adequate microbiological stability.

The average droplet size of the present spreads can be varied easily, by adjusting the conditions during the preparation. If, for example, the spread is prepared using Votator ® equipment, then the average droplet size can be decreased, for example by increasing the shear forces exerted in the A-unit, e.g. by increasing the rotor speed or the number of blades, or by decreasing the annulus.

The present spreads can suitably be used e.g. on bread as butter substitute. However, they can also be suitable for use as complete spread on their own, for example when containing a cheese or a fruit flavour.

Similarly, a spread suitable for use as complete spread on its own can be prepared by incorporating therein bits of edible matter, for example bits of vegetables, e.g. cucumber, grated cheese and herbs and spices, e.g. garlic powder and dried parsley. The content of dispersed bits in the product may be substantial, but preferably it does not exceed 1 part by weight per part by weight of water-in-oil dispersion. More preferably, the amount of dispersed bits is 0.005-0.5 parts by weight of water-in-oil dispersion.

EXAMPLE 1

An oil-continuous spread containing 20 wt.% fat was prepared by plastification of an aqueous phase and a fat phase of the following composition:

| Aqueous phase | wt. % |
| --- | --- |
| Paselli SA2 ® maltodextrin (Hydrolyzed potato starch with DE = 2) | 14.5 |
| Gelatin (270 bloom) | 2.0 |
| NaCl | 1.8 |
| K-sorbate | 0.2 |
| Lactic acid | 0.02 |
| Water | 81.4 |

When left to stand at ambient temperature, the aqueous phase composition formed a gel.

| Fat phase | wt. % |
| --- | --- |
| Soyabean oil | 81.5 |
| Interesterified blend of a 1:1 mixture of a lower melting fraction of fully hydrogenated palmkernel oil and fully hydrogenated palm oil | 17.0 |
| Hymono 4404 ® (Monoglyceride composition prepared from partially hydrogenated sunflower oil) | 1.5 |

The N-values of the fat phase composition, determined with NMR as indicated above, at 5°, 20° and 35° C. were 30.6, 15.5 and 3.4, respectively.

The aqueous phase composition was pasteurized by heating to 90° C. and then the composition was cooled immediately to 60° C. The fat phase composition was heated to 60° C.

The spread was prepared on laboratory scale by continuously feeding 4 parts by weight of aqueous phase with 1 part by weight of fat phase into an agitated crystallizer provided with a cooling jacket, cooled with tapwater. The shaft speed was about 5500 rpm. The water-in-oil emulsion left the crystallizer having a temperature of about 28° C. The emulsion was subsequently passed through another cooled, agitated crystallizer (Votator®C-unit) operated with a shaft speed of 1400 rpm. The plastified spread left this crystallizer having a temperature of 23° C. and was filled into tubs. The product was stored for two weeks at 5° C.

The M*-value of the aqueous composition and some product properties are given in Table I.

For comparison, the experiment was repeated using aqueous phase compositions without gelatin and containing various amounts of Paselli SA2 maltodextrin. The aqueous phase composition of comparisons B and C did not form gels; the composition of comparison A formed a very weak gel. The results are given in Table I.

TABLE I

|  | gelatin | Paselli | M*-value |
|---|---|---|---|
| Ex. 1 | 2.0 wt. % | 14.5 wt. % | 39 mPa.s |
| Comp. A | — | 14.5 | 19 mPa.s |
| Comp. B | — | 10.0 | 10 mPa.s |
| Comp. C | — | 7.5 | 7 mPa.s |

|  | Water droplet size (dv) | Conductivity* (μS/cm) | T-50** (°C.) | Loss of water at spreading # |
|---|---|---|---|---|
| Ex. 1 | 50 μm | 0.001 | 38 | + |
| Comp. A | 30 μm | 2 | 41 | — |
| Comp. B | 30 μm | 12 | 26 | — |
| Comp. C | 30 μm | 36 | 25 | — |

*S indicates Siemens. The conductivity is measured at 15° C. At low conductivity values the risk of microbiological deterioration occurring is small.
**The T-50-value indicates the temperature at which half of the emulsion is broken down, as determined by measuring the release of salt at gradually increasing temperatures via the conductivity. Products having a T-50-value substantially higher than the temperature in the mouth will not break down properly and will consequently have a poor flavour release in the mouth.
A + indicates that the spread did not release moisture when it was spread. A − indicates some release of water, — indicates substantial release of water upon spreading.

The experiments show that comparison A does not destabilize sufficiently in the mouth and therefore has a poor oral response. All three comparisons lose water when they are subjected to spreading conditions. Comparison C may have a rather poor microbiological stability. Example 1, however, the only composition having a sufficiently high M*-value, has good flavour release, does not lose water upon spreading and has good microbiological stability.

EXAMPLE 2

Example 1 was repeated a number of times using a variety of emulsifiers at various levels. Experiments were carried out using 1.0 or 2.0 wt.% Hymono 4404 instead of 1.5 wt.%. Similar results were obtained. Similar results were also obtained when using 1.5 wt.% or 2 wt.% of Cetodan® (acetic acid ester of monoglycerides) and also when using 1.5 or 2 wt.% Admul PGE 1411® (polyglycerolester) instead of the Hymono emulsifier.

EXAMPLE 3

Example 1 was repeated twice using fat phases comprising, instead of soybean oil, sunflower oil and corn oil, respectively. Similar results were obtained. The N-values of the fat phase composition at 5°, 20° and 35° C. remained essentially the same. Similar results were also obtained when using a fat phase comprising:

| Interesterified blend of a 2:3 (wt) mixture of (unhydrogenated) Malaysian palm oil and palmkernel oil | 18 wt. % |
|---|---|
| Soyabean oil hydrogenated to a melting point of 38° C. | 26 wt. % |
| Soyabean oil | 55 wt. % |
| Hymono 4404 ® | 1.5 wt. %. |

The N-values of this fat blend at 5°, 20° and 35° C. were 27.0, 2.9 and 0.0, respectively.

EXAMPLE 4

Example 1 was repeated, but, instead of the gelatin and Paselli SA2 maltodextrin, the aqueous phase contained 18 wt.% N-oil® (hydrolyzed tapioca starch having a DE-value of about 4–5) and 0.3 wt.% sodium caseinate. The M*-value was about 40 mPa.s. The aqueous phase composition formed a gel when it was left to stand at ambient temperature. An adequate water-in-oil emulsion spread was obtained that did not release water on spreading.

EXAMPLE 5

A spread was prepared as in Example 4, but using as aqueous phase the following composition:

| Na-caseinate | 15.8 wt. % |
|---|---|
| CaCl₂ | 3.5 wt. % |
| NaCl | 2.2 wt. % |
| K-sorbate | 0.2 wt. % |
| Citric acid to pH 5.7 | |
| Balance of water | |

The aqueous phase ingredients, except the calcium chloride and citric acid, were homogenized at about 40° C. Then the calcium chloride and citric acid were added the mixture was kept at 90° C. for 1 hour. (The CaCl₂ converted the (non-gelling) Na-caseinate into Ca-caseinate, which is capable of gelling.)

The aqueous phase was then cooled down to 60° C. and processed with the fat phase as in Example 4. A water-in-oil spread was obtained that did not release water on spreading. The M*-value was well above 72 mPa.s. The precise value could not be determined because it exceeded the measuring range of the instrument.

EXAMPLE 6

Example 1 was repeated, using the same aqueous phase and fat phase compositions, but using a series of two cooled micro Votator®C-units, the first one being operated at 2,000 rpm and the second one at 1,000 rpm. The product left the first unit with a temperature of about 20° C. and the second one at about 17° C. A suitable spread was obtained.

For comparison, the experiment was repeated using 0.6 wt.% guar gum and 14.5 wt.% maltodextrin with DE=17 in the aqueous phase composition instead of the gelatin and Paselli SA2.

The M*-value of this composition was about 30 mPa.s, but the composition did not form a gel. The product obtained did not have a proper fat-continuous phase.

EXAMPLE 7

Example 6 was repeated using as aqueous phase the following composition:

| | |
|---|---|
| i-carrageenan | 2.8 wt. % |
| K-sorbate | 0.2 wt. % |
| Lactic acid | 0.02 wt. % |
| Water | 97 wt. % |

The composition formed a gel when left to stand at ambient temperature. The M*-value was about 35 mPa.s. A suitable spread was obtained that did not release water on spreading.

For comparison, the experiment was repeated, using as aqueous phase the following composition:

| | |
|---|---|
| K-carrageenan | 1.0 wt. % |
| Locust bean gum | 0.68 wt. % |
| KCl | 0.32 wt. % |
| K-sorbate | 0.2 wt. % |
| Salt | 3.44 wt. % |
| Lactic acid | 0.01 wt. % |
| Water | 94.4 wt. % |

This composition formed a gel when it was left at ambient temperature. The M*-value was about 16 mPa.s. A fat-continuous-product could be obtained with this composition, but it released water when it was spread.

The experiment was repeated once more, using as aqueous phase the following composition:

| | |
|---|---|
| Xanthan gum | 0.2 wt. % |
| Locust bean gum | 0.8 wt. % |
| K-sorbate | 0.2 wt. % |
| Salt | 1.8 wt. % |
| Lactic acid | 0.02 wt. % |
| Water | 97 wt. % |

This composition formed a gel. The viscosity at a shear rate of 1709 sec.$^{-1}$ at 5° C. of this composition was as high as 130 mPa.s. The M*-value at 17090 sec.$^{-1}$, however, was only 18 mPa.s. The product obtained was fat-continuous, but it lost water when it was subjected to spreading.

EXAMPLE 8

A fat-continuous spread containing about 15 wt.% fat was prepared, using as aqueous phase the following composition:

| | |
|---|---|
| N-oil ® | 20.0 wt. % |
| NaCl | 1.8 wt. % |
| K-sorbate | 0.2 wt. % |
| Lactic acid to pH 4.8 | |
| Balance of water | |

The composition was a gel-forming one and the M*-value was about 50 mPa.s.

The composition used as fat phase was the same as in Example 1, but containing sunflower oil instead of soyabean oil.

The spread was prepared by continuously mixing 85 wt.% aqueous phase composition with 15 wt.% fat phase composition and further using the process described in Example 1.

A stable fat-continuous product was obtained that did not lose water when it was spread, but that destabilized adequately at mouth temperature.

EXAMPLE 9

A spread containing about 25 wt.% fat was prepared on a pilot plant Votator ® at a throughput of 24 kg/hour.

The following fat phase and aqueous phase compositions were used:

| Fat phase | wt. % |
|---|---|
| Interesterified blend of a 1:1 mixture of fully hydrogenated coconut oil and fully hydrogenated palm oil | 20.0 |
| Sunflower oil | 78.5 |
| Hymono 4404 ® | 1.5 |

| Aqueous phase | wt. % |
|---|---|
| Gelatin (270 bloom) | 5.0 |
| NaCl | 1.8 |
| K-sorbate | 0.2 |
| Lactic acid | 0.02 |
| Water | 93 |

This gel-forming aqueous phase composition had an M*-value of 32 mPa.s. The N-values of the fat phase composition at 5°, 20° and 35° C. were 19.9, 11.6 and 2.7, respectively.

One part by weight of fat phase composition and three parts by weight of aqueous phase composition were continuously mixed at 70° C. and passed through a series of two A-units and a Euromatic ® (a high shear mixer). The A-units were operated at shaft speeds of 1500 and 275 rpm and at temperatures of 7° and 20° C., respectively. The product left the Euromatic at 28° C. It was filled into tubs and stored at 5° C. for two weeks. A satisfactory spread was obtained having a conductivity at 15° C. of 0.24 µS/cm. The product did not release water when it was subjected to spreading. It had a suitable breakdown in the mouth.

EXAMPLE 10

A 20% fat spread was prepared using the same aqueous phase composition as in Example 1. As fat phase the same composition was used as in Example 9, but containing further 0.002 wt.% β-carotine as colouring agent and 0.2 wt.% flavour compounds. The N-values of the fat phase composition were the same as in Example 9. The product was prepared in essentially the same way as described in Example 1. The product was stored at 5° C. for two weeks. The T-50 salt release value of the product was 39.5° C. The volume averaged diameter of the aqueous phase droplets (dv) was 45 µm. At 15° C. the conductivity of the product was 0.004 µS/cm. The product did not release water on spreading. The hardness of the product was determined with a cone penetrometer as described in J. A. O. C. S. 36 (1959), 345–348 ("C-values"). The C-values at 5°, 10°, 15° and 20° C. were 434, 308, 247 and 134 g/cm$^2$, respectively.

In a consumer test with 25 housewives the 20% fat spread was tested for "overall liking" against a standard 40% fat spread. No significant difference was found. Thus, although it contained only half the amount of fat, the consumers liked the product according to the present invention as much as the conventional 40% fat spread with which it was compared.

EXAMPLE 11

A spread suitable for use as garlic butter replacement was prepared as follows:

A product was prepared as described in Example 10 but, before filling it into tubs, 1 part by weight of product leaving the second crystallizer was mixed with 0.005 parts by weight of garlic powder and 0.01 part by weight of dried parsley. The product was stored for two weeks at 5° C. It was a suitable garlic butter substitute.

We claim:

1. A low fat spread containing less than 30 wt.% fat, comprising from 10 to 30 wt.% continuous fat phase and from 90 to 70 wt.% dispersed aqueous phase, wherein the aqueous phase is gel-forming and has a viscosity of at least 25 mPa.s at a shear rate of 17090 sec.$^{-1}$ and a temperature of 5° C.

2. The spread according to claim 1, wherein the viscosity is at least 30 mPa.s at a shear rate of 17090 sec.$^{-1}$ and a temperature of 5° C.

3. The spread according to claim 1, wherein the viscosity at 17090 sec.$^{-1}$ and 5° C. is not higher than 200 mPa.s.

4. The spread according to claim 3, wherein the viscosity at 17090 sec.$^{-1}$ and 5° C. is at least 35 and at most 100 mPa.s.

5. The spread according to claim 1, wherein the aqueous phase comprises at least 60 wt.% water.

6. The spread according to claim 5, wherein the aqueous phase comprises at least 75 wt.% water.

7. The spread according to claim 1, wherein the aqueous phase comprises 1-25 wt.% gelling agent.

8. The spread according to claim 7, wherein the gelling agent comprises gelling hydrolyzed starch derivative at from 10 to 20 wt.% of the aqueous phase.

9. The spread according to claim 7, wherein the gelling agent comprises gelatin, carrageenan or a mixture thereof at from 1 to 10 wt.% of the aqueous phase.

10. The spread according to claim 9, wherein the gelling agent comprises gelatin, carrageenan or a mixture thereof at from 2 to 5 wt.% of the aqueous phase.

11. The spread according to claim 7, wherein the gelling agent comprises a gelling hydrolyzed starch derivative at from 3-20 wt.% of the aqueous phase and a gelling agent other than a hydrolyzed starch derivative at from 0.5-5 wt.% of the aqueous phase.

12. The spread according to claim 11, wherein the gelling agent comprises said gelling hydrolyzed starch derivative at from 5-17 wt.% of the aqueous phase.

13. The spread according to claim 12, wherein the gelling agent comprises the gelling hydrolyzed starch derivative at from 5-15 wt.% of the aqueous phase and a gelling agent other than a hydrolyzed starch derivative at from 0.5 to 4 wt.% of the aqueous phase.

14. The spread according to claim 1 comprising 15 to 30 wt.% fat.

15. The spread according to claim 14, comprising 17 to 25 wt.% fat.

16. The spread according to claim 1, further comprising, dispersed therein, bits of edible matter.

17. A low fat spread containing less than 30 wt.% fat, comprising from 10 to 30 wt.% continuous fat phase and from 90 to 70 wt.% dispersed aqueous phase, wherein the aqueous phase is gel-forming and has a viscosity of at least 25 mPa.s at a shear rate of 17090 sec.$^{-1}$ and a temperature of 5° C. and said aqueous phase comprises up to 20% non-gelling hydrolyzed starch derivative.

18. The spread according to claim 17, wherein the non-gelling hydrolyzed starch derivative comprises non-gelling maltodextrin at from 10 to 15 wt.% of the aqueous phase.

* * * * *